J. P. BROPHY.
SPROCKET.
APPLICATION FILED FEB. 23, 1915.

1,292,242.

Patented Jan. 21, 1919.

Witnesses=
O. M. Kappler
Mary Gladwell

Inventor
John P. Brophy
By Fay, Oberlin and Fay
Attorneys

UNITED STATES PATENT OFFICE.

JOHN P. BROPHY, OF CLEVELAND, OHIO.

SPROCKET.

1,292,242.

Specification of Letters Patent.   Patented Jan. 21, 1919.

Application filed February 23, 1915.   Serial No. 9,825.

*To all whom it may concern:*

Be it known that I, JOHN P. BROPHY, a citizen of the United States, and a resident of Cleveland, county of Cuyahoga, and State of Ohio, have invented a new and useful Improvement in Sprockets, of which the following is a specification, the principle of the invention being herein explained and the best mode in which I have contemplated applying that principle, so as to distinguish it from other inventions.

The subject of the present improvement is a sprocket wheel particularly adapted for use in motion picture machines, in which I have attempted to construct a sprocket which will give much greater service than the sprockets now in use, and in which the cost of replacement will be very much less than at present. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1:
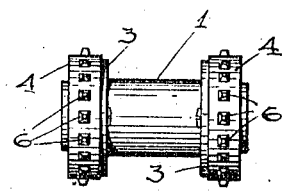
Figure 2:
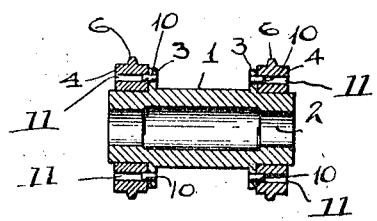
Figure 4:
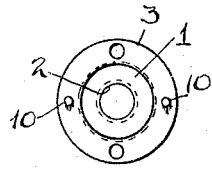
Figure 3:
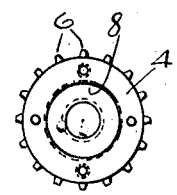
Figure 5:
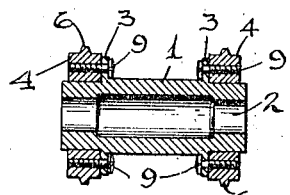

Figure 1 is a side elevation of my improved sprocket wheel; Fig. 2 is a longitudinal section through the same; Fig. 3 is an end elevation of the sprocket wheel; Fig. 4 is an end elevation of the hub of the wheel; and Fig. 5 is a longitudinal section taken at right angles to the plane of the section in Fig. 2.

Referring to Fig. 1, there will be seen a body piece 1 which will be of general cylindrical form, and will be apertured as at 2 to permit of its introduction over a shaft. Adjacent to either end of the cylindrical body 1 are plates or collars 3 against the opposite faces of which there will be mounted sprockets 4, each sprocket consisting of a collar provided with a plurality of peripherally formed teeth 6. These collars will of course be provided with central apertures 8 adapting them to be slidably fitted over the ends of the cylindrical body 1, and in order to center them on such body they are moved into contact with the outer faces of the plates 3 and are then maintained in such position and in non-rotatable engagement on the cylindrical body by means of screws 9 passing through the plates and into the sprockets. In order to center the sprockets on the cylindrical body there are provided on the plates pins 10 at diametrically opposite points which fit into similarly spaced and equal sized apertures 11 in the sprockets.

The present sprocket will thus be seen to be made up of three parts which can be readily and accurately assembled by any one without the aid of any special tools. All of the parts will be seen to be relatively inexpensive to manufacture, and should one part wear longer than another, the worn part can be replaced at slight expense without the necessity for discarding the entire sprocket wheel, as has been the case in the past.

It will be noticed that by making the sprockets removable from the body, it is possible to remove the sprockets and turn them around, thus exposing the other sides of the teeth 6 so that each sprocket has practically double the life of the sprockets now in general use. This is an important feature, since the wear on the sprocket teeth is entirely on one side, and by merely taking the sprockets off and turning them the wear can be made even, and much greater service can be secured from a single sprocket.

Other modes of applying the principle of my invention may be employed instead of the one explained, change being made as regards the mechanism herein disclosed, provided the means stated by the claim or the equivalent of such stated means be employed.

I therefore particularly point out and distinctly claim as my invention:—

A sprocket wheel for motion picture machines comprising a cylindrical body apertured for attachment to a shaft and having collars thereon adjacent to each end of the same, each of such collars being provided with a plurality of apertures and also a plurality of pins projecting at right angles to their outer faces, a sprocket mounted on each end of said body with either side in contact with the outer side of one of said collars, and having apertures formed to receive said pins in such collars and other threaded apertures registering with the apertures in such collars and screws mounted through such apertures in said collars and engaging in such threaded apertures in said sprockets to hold the same in position against such collars.

Signed by me, this 19th day of February, 1915.

JOHN P. BROPHY.

Attested by—
C. BERGSTROM,
P. B. HUSTON.